(12) United States Patent
Hennings et al.

(10) Patent No.: US 8,640,801 B2
(45) Date of Patent: Feb. 4, 2014

(54) PROPULSION DEVICE FOR AUTOMOBILE WITH PORTAL AXLE COMPRISING AN ELECTRICAL MACHINE

(75) Inventors: Stephan Hennings, Leonberg (DE); Daniel Armbruster, Weil der Stadt (DE); Jochen Schmid, Sersheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/383,273

(22) PCT Filed: May 21, 2010

(86) PCT No.: PCT/EP2010/003144
§ 371 (c)(1),
(2), (4) Date: Jan. 11, 2012

(87) PCT Pub. No.: WO2011/003489
PCT Pub. Date: Jan. 13, 2011

(65) Prior Publication Data
US 2012/0103708 A1    May 3, 2012

Related U.S. Application Data

(60) Provisional application No. 61/227,542, filed on Jul. 22, 2009.

(30) Foreign Application Priority Data

Jul. 10, 2009    (DE) .......................... 10 2009 033 531

(51) Int. Cl.
*B60K 1/02*    (2006.01)
(52) U.S. Cl.
USPC ....................................... 180/65.6

(58) Field of Classification Search
CPC ................. B60K 7/007; B60K 17/046; B60K 2007/0046; B60K 2007/0061
USPC ............. 180/65.1, 65.22, 65.51, 65.6, 63, 59, 180/291, 292, 293, 294, 297, 255, 348, 371, 180/372, 379, 376, 344; 475/149
See application file for complete search history.

(56) References Cited

U.S. PATENT DOCUMENTS 1,093,631 A * 4/1914 Kennedy ...................... 180/349
1,251,749 A * 1/1918 Cilley .......................... 180/65.6
(Continued)

FOREIGN PATENT DOCUMENTS

DE    37 25 620    2/1989
DE    41 08 647    9/1992
(Continued)

*Primary Examiner* — John R Olszwski
*Assistant Examiner* — Brodie Follman
(74) *Attorney, Agent, or Firm* — Gerald E. Hespos; Michael J. Porco; Matthew T. Hespos

(57) ABSTRACT

A drive apparatus (1) for a motor vehicle has a hollow portal axle (2) that accommodates two electrical machines (4). Wheels (12) are mounted rotatably at opposite ends of the portal axle (2) and can be driven by the electrical machine (4) associated with the respective wheel. A step-down gear mechanism (8, 9) is arranged between each electrical machine (4) and the respective wheel (12) and a separate connection from the respective wheel to the step-down gear mechanism, permits the wheel to be mounted in a non-rigid manner. The respective step-down gear mechanism (8, 9) is connected to the respective wheel (12) by a cardan shaft (10).

12 Claims, 1 Drawing Sheet

(56) References Cited

U.S. PATENT DOCUMENTS

| | | | | |
|---|---|---|---|---|
| 1,728,889 A * | 9/1929 | Kemble | | 180/24.07 |
| 3,027,960 A * | 4/1962 | Ditel | | 180/244 |
| 3,439,767 A * | 4/1969 | Lynes et al. | | 180/60 |
| 3,799,284 A * | 3/1974 | Hender | | 180/65.25 |
| 4,284,158 A * | 8/1981 | Schield | | 180/344 |
| 4,454,640 A * | 6/1984 | Egusa et al. | | 29/898.063 |
| 4,953,646 A * | 9/1990 | Kim | | 180/65.245 |
| 5,096,011 A * | 3/1992 | Oslapas | | 180/412 |
| 5,120,282 A * | 6/1992 | Fjallstrom | | 475/5 |
| 5,168,946 A * | 12/1992 | Dorgan | | 180/6.44 |
| 5,718,300 A * | 2/1998 | Frost | | 180/65.1 |
| 5,743,347 A * | 4/1998 | Gingerich | | 180/65.1 |
| 5,751,081 A * | 5/1998 | Morikawa | | 310/83 |
| 5,829,542 A * | 11/1998 | Lutz | | 180/65.6 |
| 5,915,488 A * | 6/1999 | Fliege | | 180/65.22 |
| 5,927,417 A * | 7/1999 | Brunner et al. | | 180/65.6 |
| 5,947,855 A * | 9/1999 | Weiss | | 475/5 |
| 6,024,182 A * | 2/2000 | Hamada et al. | | 180/6.28 |
| 6,053,833 A * | 4/2000 | Masaki | | 475/2 |
| 6,349,782 B1 * | 2/2002 | Sekiya et al. | | 180/65.25 |
| 6,662,896 B1 * | 12/2003 | Karlsson | | 180/348 |
| 6,727,620 B2 * | 4/2004 | White et al. | | 310/112 |
| 6,749,532 B2 * | 6/2004 | Wachauer | | 475/5 |
| 6,904,988 B2 * | 6/2005 | Harrup et al. | | 180/65.6 |
| 6,935,451 B2 * | 8/2005 | Bell et al. | | 180/65.25 |
| 6,948,576 B2 * | 9/2005 | Angeles | | 180/23 |
| 6,973,982 B2 * | 12/2005 | Yoshikawa et al. | | 429/430 |
| 6,978,853 B2 * | 12/2005 | Bennett | | 180/65.1 |
| 7,083,015 B2 * | 8/2006 | Ruppert et al. | | 180/65.1 |
| 7,112,155 B2 * | 9/2006 | Keuth | | 475/6 |
| 7,255,187 B2 * | 8/2007 | Bell et al. | | 180/65.25 |
| 7,276,005 B2 * | 10/2007 | Morikawa | | 475/5 |
| 7,314,105 B2 * | 1/2008 | Varela | | 180/65.6 |
| 7,353,904 B2 * | 4/2008 | Phillips | | 180/253 |
| 7,363,995 B2 * | 4/2008 | Downs et al. | | 180/65.1 |
| 7,364,528 B2 * | 4/2008 | Brill et al. | | 475/332 |
| 7,441,623 B2 * | 10/2008 | Casey et al. | | 180/243 |
| 7,448,458 B2 * | 11/2008 | Meyer | | 180/65.31 |
| 7,458,433 B2 * | 12/2008 | Harrup et al. | | 180/65.6 |
| 7,533,747 B2 * | 5/2009 | Heinen | | 180/65.51 |
| 7,635,039 B2 * | 12/2009 | Fujiwara et al. | | 180/65.21 |
| 7,845,445 B2 * | 12/2010 | Cooper et al. | | 180/65.51 |
| 7,854,674 B2 * | 12/2010 | Freudenreich | | 475/5 |
| 7,866,423 B2 * | 1/2011 | Ruppert et al. | | 180/65.1 |
| 7,935,014 B2 | 5/2011 | Bachmann | | |
| 7,975,790 B2 * | 7/2011 | Kim et al. | | 180/65.51 |
| 8,042,883 B2 * | 10/2011 | Nakano | | 303/115.1 |
| 8,091,677 B2 * | 1/2012 | Murty | | 180/293 |
| 2001/0004948 A1 * | 6/2001 | Ruppert et al. | | 180/65.6 |
| 2001/0011611 A1 * | 8/2001 | Poerschmann | | 180/65.1 |
| 2003/0010547 A1 * | 1/2003 | Wachauer | | 180/65.1 |
| 2003/0067234 A1 * | 4/2003 | White et al. | | 310/112 |
| 2003/0127260 A1 * | 7/2003 | Angeles | | 180/23 |
| 2004/0089485 A1 * | 5/2004 | Kramer et al. | | 180/65.1 |
| 2004/0124019 A1 * | 7/2004 | Harrup et al. | | 180/65.1 |
| 2005/0006967 A1 * | 1/2005 | Bologna | | 310/83 |
| 2005/0049103 A1 * | 3/2005 | Pecnik et al. | | 475/221 |
| 2005/0092533 A1 * | 5/2005 | Ishii | | 180/65.1 |
| 2005/0124451 A1 * | 6/2005 | Morikawa | | 475/6 |
| 2005/0145424 A1 * | 7/2005 | Bell et al. | | 180/65.2 |
| 2006/0037792 A1 * | 2/2006 | Boss et al. | | 180/65.6 |
| 2006/0054368 A1 * | 3/2006 | Varela | | 180/65.5 |
| 2006/0118344 A1 * | 6/2006 | Rosch | | 180/65.1 |
| 2006/0180366 A1 * | 8/2006 | Brill et al. | | 180/65.6 |
| 2006/0225930 A1 * | 10/2006 | Schulte | | 180/65.4 |
| 2007/0068723 A1 * | 3/2007 | Brill et al. | | 180/374 |
| 2007/0137908 A1 * | 6/2007 | Fujiwara et al. | | 180/65.2 |
| 2007/0158119 A1 * | 7/2007 | Pascoe | | 180/65.2 |
| 2008/0179116 A1 * | 7/2008 | Ikenoya et al. | | 180/63 |
| 2008/0202826 A1 * | 8/2008 | Freudenreich | | 180/6.5 |
| 2009/0014223 A1 * | 1/2009 | Jones et al. | | 180/65.8 |
| 2009/0071732 A1 * | 3/2009 | Kim et al. | | 180/24.07 |
| 2009/0091093 A1 * | 4/2009 | Urababa et al. | | 280/5.511 |
| 2009/0242289 A1 * | 10/2009 | Murty | | 180/65.265 |
| 2010/0108417 A1 * | 5/2010 | Gilmore | | 180/65.51 |
| 2011/0094807 A1 * | 4/2011 | Pruitt et al. | | 180/65.6 |
| 2011/0109052 A1 * | 5/2011 | Hatzikakidis | | 280/5.5 |
| 2011/0139522 A1 * | 6/2011 | Takenaka et al. | | 180/65.1 |
| 2011/0144848 A1 * | 6/2011 | Yoshizue et al. | | 701/22 |
| 2011/0175475 A1 * | 7/2011 | Makino et al. | | 310/78 |
| 2011/0209934 A1 * | 9/2011 | Armbruster et al. | | 180/65.25 |
| 2011/0232978 A1 * | 9/2011 | Schoon | | 180/6.5 |
| 2011/0232984 A1 * | 9/2011 | Wurm | | 180/69.6 |
| 2011/0259657 A1 * | 10/2011 | Fuechtner | | 180/65.21 |
| 2011/0300985 A1 * | 12/2011 | Kunze et al. | | 475/149 |
| 2012/0052995 A1 * | 3/2012 | Scarbo et al. | | 474/86 |
| 2012/0080247 A1 * | 4/2012 | Schmid et al. | | 180/65.1 |
| 2012/0103708 A1 * | 5/2012 | Hennings et al. | | 180/65.6 |
| 2012/0217789 A1 * | 8/2012 | Yamamoto et al. | | 301/6.5 |
| 2012/0229004 A1 * | 9/2012 | Takahashi et al. | | 310/67 R |
| 2012/0258831 A1 * | 10/2012 | Knoblauch et al. | | 475/5 |
| 2012/0279793 A1 * | 11/2012 | Kikuchi et al. | | 180/197 |

FOREIGN PATENT DOCUMENTS

| | | |
|---|---|---|
| DE | 44 21 425 | 8/1995 |
| DE | 44 34 237 | 3/1996 |
| DE | 296 11 867 | 10/1996 |
| DE | 295 18 401 | 4/1997 |
| DE | 196 23 738 | 12/1997 |
| DE | 202 13 670 | 2/2004 |
| DE | 102 48 173 | 5/2004 |
| DE | 10 2004 003 634 | 11/2005 |
| DE | 10 2005 010 514 | 9/2006 |
| DE | 10 2007 012 413 | 9/2008 |
| WO | 03/032472 | 4/2003 |
| WO | 2007/097086 | 8/2007 |

* cited by examiner

PROPULSION DEVICE FOR AUTOMOBILE WITH PORTAL AXLE COMPRISING AN ELECTRICAL MACHINE

BACKGROUND OF THE INVENTION

1. Field of the Invention

The invention relates to a drive apparatus for a motor vehicle, having a hollow portal axle which accommodates two electrical machines, within each case one wheel being rotatably mounted in the region of the two ends of the portal axle and it being possible for each wheel to be driven only by means of the electrical machine which is associated with said wheel, and having a step-down gear mechanism which is arranged between the respective electrical machine and the wheel which is associated with said electrical machine.

2. Description of the Related Art

A drive apparatus of this kind, which is used in a utility vehicle, is known from DE 295 18 401 U1. This utility vehicle is a city bus for transporting people. In city buses, a carriage floor which is arranged at a low level and runs through the entire bus is required, in particular in the region of the rear axle which is in the form of a rigid axle. In order to achieve this, the hollow portal axle is provided with the two electrical machines which are accommodated by said portal axle and which are in the form of electric drive motors. A step-down gear mechanism, which is in the form of a spur gear stage, is arranged between the respective electrical machine and the wheel which is associated with said electrical machine.

A drive apparatus having the features of the type mentioned in the introduction is also known from DE 296 11 867 U1.

DE 44 34 237 A1 discloses a vehicle axle having two electrical single-wheel drives, in particular for agricultural vehicles. The two single-wheel drives can be connected in a force-fitting manner by means of a clutch in order to avoid overloading of one single-wheel drive over a relatively long period of time in the event of non-uniform loading of the drive wheels of the vehicle axle. The respective electric single-wheel drive is connected to a step-down gear mechanism, which is in the form of a spur gear stage, and said step-down gear mechanism is connected to a planetary gear mechanism which is connected to the wheel which is associated with this single-wheel drive. The axle of the wheel is arranged radially offset in relation to the rotation axis of the rotor of the electric motor. The electrical input energy for the respective electric motor is generated, in particular, by a generator which is driven by the vehicle's own internal combustion engine.

DE 10 2004 003 634 A1 discloses a portal axle drive of a motor vehicle, with the flow of torque in relation to the respective wheel being introduced from a planetary gear mechanism into the output shaft, which is connected to the wheel in a rotationally fixed manner, via a step-down gear mechanism which is in the form of a spur gear stage.

DE 202 13 670 U1 describes a directly driven drive axle of a motor vehicle having two electric drive motors which are mounted in a common housing.

One disadvantage of the described drive apparatuses or axle designs is, in particular if these designs relate to a portal axle, that they are in the form of rigid axles. For vibration and comfort reasons, drive apparatuses of this kind are therefore reserved for use in utility vehicles, for example in buses or agricultural vehicles.

The object of the present invention is to provide, in a drive apparatus of the kind mentioned in the introduction, a separate connection from the respective wheel to the step-down gear mechanism, said connection permitting the wheel to be mounted in a non-rigid manner.

SUMMARY OF THE INVENTION

The object is achieved in that the respective step-down gear mechanism is connected to the wheel which is associated with this step-down gear mechanism by means of a cardan shaft.

The force-fitting connection between the step-down gear mechanism and the wheel which is associated with said step-down gear mechanism by means of the cardan shaft allows torques to be transmitted without the need for the axle to be rigid. Consequently, the motor vehicle which is provided with the drive apparatus can, in contrast to the motor vehicles according to the discussed prior art, be provided with an independent suspension system. This considerably expands the field of use for the drive apparatus, in particular to cars in which it is advantageous, for reasons of driving comfort and driving safety, if each wheel can undergo spring compression and spring extension individually, that is to say independently of the other wheels of the vehicle.

The respective cardan shaft is preferably designed as a double cardan joint and, in the region of its ends, is connected to an output shaft of the spur gear stage and a wheel hub in a force-fitting manner.

The radial offset of the portal axle and the axle of the wheel scar is preferably compensated for by the step-down gear mechanism being in the form of a spur gear stage. It is considered to be particularly advantageous if a planetary gear mechanism is arranged between the respective electrical machine and the spur gear stage which faces said electrical machine. By virtue of this gear mechanism design between the electrical machine and the wheel which is associated with said electrical machine, it is possible to transmit a particularly high torque to the wheel, but with the maximum speed which can be reached being reduced.

The spur gear stages and/or the planetary gear mechanism are preferably constituent parts of the portal axle. The portal axle is, in particular, rigidly fixed to a chassis crossmember and the body of the motor vehicle.

According to one particular embodiment of the invention, provision is made for the portal axle to have an integral housing for accommodating the two electrical machines. Therefore, the electrical machines do not require any installation space outside the housing, and, for this reason, the portal frame can be arranged in a space-saving manner in the undercarriage region of the vehicle. It is considered particularly advantageous if the housing of the respective electrical machine is formed by the housing of the portal axle. The stator of the respective electrical machine is therefore connected to the integral housing in a force-fitting and rotationally fixed manner, in particular shrink-wrapped by heating the integral housing and cooling the stator of the respective electrical machine before they are joined.

For the electrical machines, a rotary angle sensor or a rotation speed sensor is preferably provided in each case for detecting the position of the rotor of the electrical machine or the rotation speed of the rotor. To this end, a sensor mating piece, of which the position is detected by the associated sensor, is provided, in particular, in the respective shaft of the electrical machine.

It is also considered advantageous if a torque sensor is provided for detecting the torque in the drive train of the respective wheel. As a result, it is possible to individually activate the respective electric drive in accordance with the desired torque which is to be introduced by means of the respective wheel.

The invention also proposes a motor vehicle, in particular a car, having a front axle and a rear axle, it being possible for the front axle and/or the rear axle to be equipped with the described drive apparatus according to the invention and to have an independent suspension system. The motor vehicle is, in particular, a motor vehicle in which the front axle is equipped with the drive apparatus according to the invention and the rear axle is driven by means of an internal combustion engine.

The motor vehicle has, in particular, an energy storage means and the electrical machines are active in the motor mode and in the generator mode.

The drive apparatus according to the invention is therefore used, in particular, in a vehicle which can be driven by means of a hybrid drive. The hybrid system serves to increase the vehicle power and reduce consumption, in particular in a sports car, by adding the additional electrical drive machines and the energy storage means. A positive or negative torque, which is specific to the wheel, can be impressed on the drive shafts at the front axle of the motor vehicle by means of the two electrical machines. The vehicle is accelerated (motor mode) or decelerated (generator mode) by operating the electrical machines. The energy storage means is discharged or charged in the process. It is important that there is no mechanical coupling between the torques of the electrical machines.

The function of the portal axis is to transmit the torque which is provided by the electrical machines to the front wheels of the vehicle by means of a suitable step-down means. To this end, a two-stage gear mechanism comprising a planetary gear stage and a spur gear stage, is in each case flange-connected to the output shafts of the electrical machines. The output shafts of the gear mechanism are connected directly to the wheels by means of cardan shafts. In this case, a separable clutch can be provided for emergencies. Therefore, a multiple-disk clutch can be formed in the step-down gear mechanism between the annulus gear and the housing. Said clutch is closed in the event of non-operation and can be hydraulically opened. Said clutch serves firstly as a safety function, so that the electrical machines can be mechanically disconnected from the wheels, for example in the event of a short circuit, and secondly acts as a component protection means. If a high torque is impressed on the drive side such that the gear mechanism or the drive shafts could be damaged, the clutch slips in order to reduce the excessive torque. The slip moment is set by the spring parameters of the contact-pressure springs which provide the clutch with a defined pretension. The gear mechanism transmission ratios allow a significant increase in the maximum torque which can be transmitted by means of the portal axle. Therefore, the torque which is produced at the respective wheel can be readily multiplied, for example by a factor of 6 to 8.

In the motor vehicle according to the invention, the portal axle which contains the electrical machines is arranged, in particular, longitudinally in relation to the front axle. The step-down means on both sides of the portal axle serve firstly to adapt the rotation speed and secondly to adjust the height in the Z direction in order to ensure a mechanical connection to the cardan shafts. In order to achieve a low center of gravity, the portal axle is to be installed as close as possible to the undercarriage of the vehicle. The portal axle is preferably positioned directly behind the steering system or a steering gear mechanism of the vehicle. In this case, the portal axle can be used universally since it is "rotatable", and therefore the axle spacing in the vertical direction can be adapted to different vehicles with different vehicle heights by means of positioning the mounts or fixing means.

Further features of the invention can be gathered from the dependent claims, the following description of the drawing and the drawing itself.

A preferred exemplary embodiment is explained in greater detail in the following description and illustrated in the drawing.

DETAILED DESCRIPTION OF THE PREFERRED EMBODIMENTS

Figure 1:
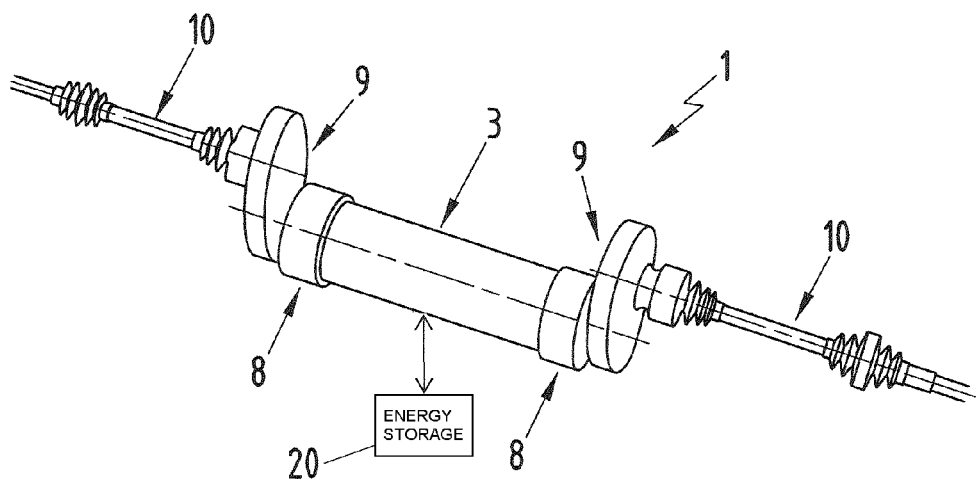
FIG. 1 shows a three-dimensional illustration of the drive apparatus according to the invention.

The motor vehicle which is equipped with the drive apparatus according to the invention is, in particular, a car which is intended to be used in racing and of which the individually suspended wheels which are associated with the rear axle are driven by means of an internal combustion engine and of which the wheels which are associated with the front axle and are likewise individually suspended can be driven by electric motor, for example in order to apply an additional drive torque by means of the front wheels. The following description relates to the design of the motor vehicle in the region of the front axle and the drive apparatus formed according to the invention in this respect. This drive apparatus 1 has a portal axle 2 with a central housing 3 which is in the form of a tube. Said housing serves to accommodate two electrical machines 4. The stator 5 of the respective machine 4 is mounted in a rotationally fixed manner in the housing 3, this housing 3 having the function of the housing of the machine 4. The stator 5 of the respective machine 4 contains the rotor 6 of said machine.

The drive apparatus 1 is designed symmetrically in relation to the plane which is arranged between the electrical machines 4 and perpendicular to the rotation axis of the rotors 6. A rotary angle sensor 7 which serves to detect the rotary angle of the respective rotor 6 is arranged in this plane of symmetry. The rotation speed of the rotors 6 can also preferably be determined by means of the sensor which is in the form of a rotation speed sensor, in order to thus be able to actuate the two electrical machines 4 in accordance with the desired driving states.

The vehicle has an energy storage means 20, and therefore the electrical machines 4 can be active in the motor mode or in the generator mode.

A planetary gear mechanism 8 is flanged-connected to the respective end of the housing 3. A further step-down gear mechanism, which is in the form of a spur gear stage 9, is arranged downstream of this planetary gear mechanism 8 in relation to the flow of torque. Said spur gear stage is flange-connected to the planetary gear mechanism 8.

The portal axle 2 which has been described up until now is located in the front end in the region of the front axle. In order to obtain a low center of gravity, the portal axle 2 is positioned as close as possible to the undercarriage of the vehicle. Furthermore, the portal axle 2 is positioned as closely as possible to a steering gear mechanism of the vehicle.

The portal axle 2 is fixed to a chassis crossmember of the vehicle at two points by means of the housing. In addition, two holders are provided on the gear mechanism above the spur gear stage 9 in order to be fixed to the body of the vehicle.

The output shaft of the respective electrical machine 4 is connected to the sun gear of the associated planetary gear mechanism 8 in a rotationally fixed manner. The annulus gear 5 of the planetary gear mechanism 8 is stationary. The planet carrier which accommodates the planetary gears is connected to the pinion of the spur gear stage 9 in a rotationally fixed manner, said spur gear stage engaging with the larger gear of the spur gear stage 9.

A cardan shaft 10, which has a joint 11 in the region of the two ends, is connected to the output of the respective spur gear stage 4 in a rotationally fixed manner. The cardan shaft 10 is connected to the hub of the associated front wheel 12 of the vehicle in a rotationally fixed manner in the region of that end of said cardan shaft which is averted from the associated spur gear stage 9, as is illustrated only for FIG. 2. This figure additionally illustrates a sprung bearing 13 for the respective front wheel 12. This is intended to illustrate an independent suspension system of the wheel 12 in a highly simplified manner.

Figure 2:
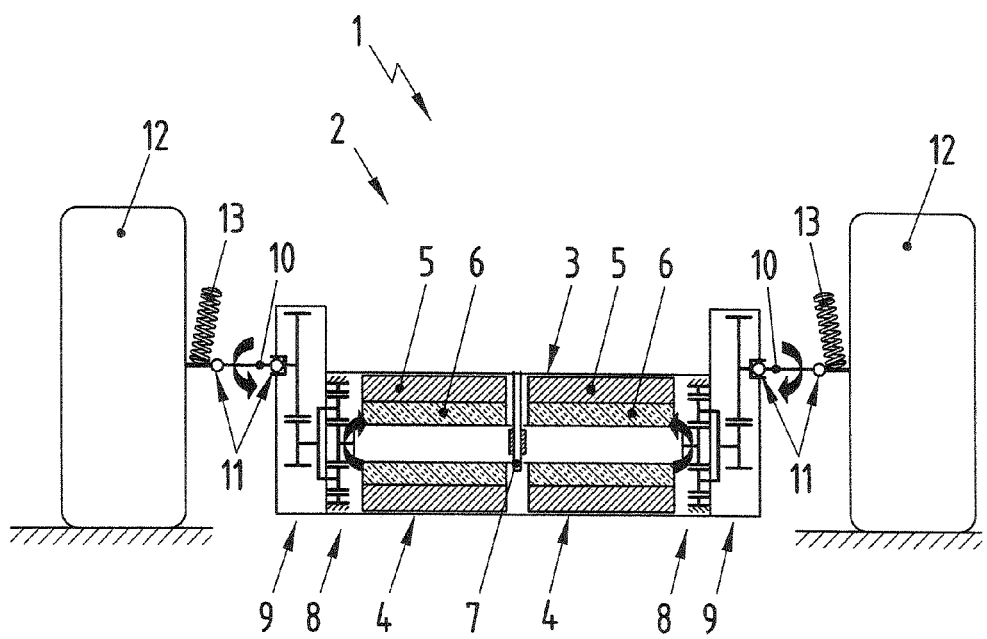
FIG. 2 shows the schematic design of the drive apparatus which is shown in FIG. 1, including the wheels which are associated with the portal axle.

FIG. 2 clearly shows that, when the drive apparatus is formed with cardan shafts 10, said drive apparatus is electrically driven, with the electrical machines 4 and the housing 3 being arranged at a lower level than that of the rotation axes of the wheels 12.

In FIG. 2, the arrows represent torque arrows for indicating the torque in the region of the respective electrical machine 4 and the cardan shaft 10 which is associated with said electrical machine, independently of whether the respective electrical machine 4 is in a motor mode or generator mode.

The invention claimed is:

1. A drive apparatus for a motor vehicle, comprising: a hollow portal axle with a hollow integral tubular housing having opposite left and right ends and an inner circumferential surface between the ends; left and right electrical machines axially aligned with one another in the housing and in proximity to the respective left and right ends of the housing, each of the electrical machines having a stator fit in a rotationally fixed manner to the inner surface of the housing and a rotor within the stator; left and right wheels being rotatably mounted respectively in regions of left and right ends of the portal axle, the left and right wheels being drivable by the respective left and right electrical machines, left and right step-down gear mechanisms arranged between the respective left and right electrical machines and the wheel associated with said electrical machine, left and right cardan shafts having driven ends connected to the respective left and right step-down gear mechanism and driving ends connected to the respective left and right wheel independent suspensions mounted in proximity to the left and right wheels.

2. The drive apparatus of claim 1, wherein the step-down gear mechanism has a spur gear stage.

3. The drive apparatus of claim 2, wherein the driven end of each of the cardan shafts is connected to an output shaft of the spur gear mechanism in a rotationally fixed manner and the driving end of each of the cardan shafts is connected to a wheel hub of the respective wheel in a rotationally fixed manner.

4. The drive apparatus as claimed in claim 3, wherein each of the step-down gear mechanisms has a planetary gear mechanism, with the planetary gear mechanism being arranged between the respective electrical machine and the spur gear stage associated with said the respective electrical machine.

5. The drive apparatus as claimed in claim 4, wherein at least one of the spur gear stages and the planetary gear mechanism are constituent parts of the portal axle.

6. The drive apparatus of claim 1, further comprising a rotary angle sensor or a rotation speed sensor in the housing of the portal axle for detecting the rotary angle or the rotation speed of the rotor of the respective electrical machine.

7. The drive apparatus of claim 6, wherein the rotary angle sensor or the rotation speed sensor is arranged between the left and right electrical machines.

8. The drive apparatus of claim 1, further comprising left and right torque sensors for detecting torque in drive trains of the respective left and right wheels.

9. The drive apparatus of claim 1, wherein the rotors of the left and right electrical machines are disposed along a common axis that is lower than rotational axes of the respective left and right wheels.

10. A motor vehicle, comprising: opposite front and rear ends, a rear axle in proximity to the rear end; left and right rear wheels mounted on the rear axle; an internal combustion engine in proximity to the rear end of the motor vehicle and being operatively connected to the rear axle for driving the rear wheels; a front axle in proximity to the front end of the motor vehicle, the front axle being equipped with a drive apparatus comprising a hollow portal axle with a hollow integral tubular housing having opposite left and right ends and an inner circumferential surface between the ends; left and right electrical machines axially aligned with one another in the housing and in proximity to the respective left and right ends of the housing, each of the electrical machines having a stator fit in a rotationally fixed manner to the inner surface of the housing and a rotor within the stator; left and right front wheels being rotatably mounted respectively in regions of left and right ends of the portal axle, the left and right front wheels being drivable by the respective left and right electrical machines, left and right step-down gear mechanisms arranged between the respective left and right electrical machines and the front wheel associated with said electrical machine, left and right cardan shafts having driven ends connected to the respective left and right step-down gear mechanism and driving ends connected to the respective left and right wheels and the left and right front wheels having independent suspension system.

11. The motor vehicle of claim 10, wherein the vehicle has an energy storage and the electrical machines being active in a motor mode and in a generator mode.

12. The motor vehicle of claim 10, wherein the rotors of the left and right electrical machines are disposed along a common axis that is lower than rotational axes of the respective left and right wheels.

* * * * *